Patented Mar. 24, 1931

1,797,241

UNITED STATES PATENT OFFICE

MARION C. REED, OF AKRON, OHIO, ASSIGNOR TO THE B. F. GOODRICH COMPANY, OF NEW YORK, N. Y., A CORPORATION OF NEW YORK

RUBBER COMPOSITION AND METHOD OF PRESERVING RUBBER

No Drawing.   Application filed November 16, 1928. Serial No. 320,004.

This invention relates to the art of preserving rubber, either in the vulcanized or unvulcanized condition, and to rubber compositions so preserved.

It is well known that many materials possess the property of retarding the deterioration which rubber normally undergoes when exposed to light, heat, and air. These materials known to those skilled in the art as "anti-oxidants" or "age-resisters", are customarily incorporated into the rubber composition before it is vulcanized. Among such age-resisters which have heretofore been proposed, organic nitrogen compounds such as the amines and especially the secondary aromatic amines have been particularly successful. The object of this invention is to provide a new and inexpensive class of efficient age-resisters, and age-resisting rubber compositions comprising such age-resisters.

This invention, in brief, consists in treating rubber with the addition product of a secondary aromatic amine with an aromatic nitro compound. Such addition products may be formed by melting the secondary amine together with the nitro compound or even by dissolving the two materials separately in a solvent in which the addition product is substantially insoluble and mixing the solutions, whereby the product is precipitated. Addition products may thus be prepared from diphenylamine, phenyl-alpha-naphthylamine, phenyl-beta-naphthylamine, alpha or beta dinaphthylamine, phenyl-toluidine, tolyl-napthylamine, s-diphenyl-p-phenylene-diamine, etc. when combined with nitrobenzene, nitrotoluene, nitronaphthalene, dinitrobenzene or toluene, trinitrotoluene, picric acid, chlor-nitrobenzene, chlor-dinitrobenzene, nitraniline, nitro-naphthylamine, etc.

*Example 1.*—For example, a series of products was prepared by mixing equimolecular amounts of phenyl-beta-naphthylamine and a nitro compound. These were melted together until the mixture was homogeneous, and were then allowed to cool. A typical tire tread composition was then prepared containing blended plantation rubbers 100 parts by weight, sulfur 5.5 parts, zinc oxide 30 parts, gas black 40 parts, mineral rubber 10 parts, palm oil 5 parts, and hexamethylene tetramine 0.75 parts. One portion was used as a control, while other portions were further mixed with 0.95 parts (0.5% of the composition) of the various addition products prepared as indicated above. The compositions were thoroughly mixed, and vulcanized in a press for 45 minutes at 294° F. to produce an optimum cure. The relative rates of aging of the various vulcanized compositions were compared by meausuring their respective tensile strengths and elongations before and after aging. Accelerated aging tests were carried out in the Geer aging oven, in which samples were maintained at a temperature of 158° F. in a constantly renewed stream of air, as well as in the Bierer-Davis bomb, in which other samples were maintained at the same temperature (158° F.) in an atmosphere of oxygen at a pressure of 300 lbs. per sq. in. In the table below T indicates ultimate tensile strength in lbs. per sq. in. and E indicates ultimate elongation in per cent. of original length.

*Aging tests of addition products*

| Age-resister | Before aging | | After 7 days in the Geer oven | | After 48 hours in Bierer-Davis bomb | |
|---|---|---|---|---|---|---|
| | T | E | T | E | T | E |
| None (control) | 3405 | 673 | 1842 | 480 | 781 | 297 |
| Phenyl-beta-naphthylamine+p-nitrotoluene | 3343 | 662 | 2526 | 570 | 2334 | 580 |
| Phenyl-beta-naphthylamine+dinitrobenzene | 3280 | 675 | 2621 | 583 | 2399 | 580 |
| Phenyl-beta-naphthylamine+trinitrotoluene | 3468 | 697 | 2567 | 567 | 2400 | 553 |
| Phenyl-beta-naphthylamine+picric acid | 3288 | 687 | 2779 | 590 | 2500 | 610 |

*Example 2.*—Further addition products were prepared from chlorinated nitro compounds and secondary amines, specifically from 2,4 dinitro-chlorbenzene with diphenylamine and phenyl-alpha-naphthylamine, and o-nitro-chlorbenzene with phenyl-beta-naphthylamine. These products were incorporated into rubber compositions in the same proportions as in Example 1 and were tested in the same manner. The results are shown in the following table.

*Aging tests of addition products*

| Age-resister | Before aging | After 7 days in the Geer oven | | After 48 hours in Bierer-Davis bomb | |
|---|---|---|---|---|---|
| | T E | T | E | T | E |
| None (control) | 3959 638 | 2182 | 473 | 810 | 327 |
| 2,4 dinitro-chlorbenzene +diphenylamine | 4131 685 | 2314 | 567 | 2396 | 563 |
| 2,4 dinitro-chlorbenzene +phenyl-alpha-naphthylamine | 4074 665 | 3193 | 633 | 2589 | 580 |
| O-nitro-chlorbenzene + phenyl-beta-naphthylamine | 4086 645 | 2672 | 515 | 2830 | 557 |

From the above results it is evident that the addition products of secondary aromatic amines with aromatic nitro compounds are extremely effective age-resisters. The reason for the excellent anti-oxidant properties of these addition products is not understood. The aromatic nitro compounds alone are not age-resisters, sometimes even accelerating the deterioration of rubber, and their addition products with such non-nitrogenous compounds as naphthalene have no beneficial effect upon the aging of rubber. The addition products of the nitro-compounds with other amines, such as the primary aromatic amines, cyclic amines, etc., have also been found to possess age-resisting properties, although they are not as active as those hereinabove described. For example, the addition products of nitro-compounds with aniline, alpha-naphthylamine, quinaldine, etc., have been found to have value as age-resisters. The exact character of the addition products of nitro compounds and amines has not been determined. It is known that they are formed from various proportions of the materials, for example, either one or two molecular equivalents of the nitro-compounds to one of the amine, but the only theories relating to the mechanism of the addition which have so far been proposed have remained entirely unsubstantiated.

Age-resisters of this class may also be formed in the rubber before or during vulcanization by the separate incorporation of the nitro compounds and the amines. The addition products may also be applied to unvulcanized or vulcanized rubber with good effect on the age-resisting properties of the rubber, such as by applying them to the surface of the rubber, as for example in solution, or in the form of a powder, paste, or suspension.

It is to be understood that the term "treating" as employed in the appended claims is used in a generic sense to include either the incorporation of the addition products of nitro compounds and amines into the rubber by milling or similar process or by addition to the rubber latex before coagulation, or to the application thereof to the surface of a mass of crude or vulcanized rubber. The term "rubber" is likewise employed in the claims in a generic sense to include caoutchouc, balata, gutta-percha, rubber isomers, and like products, whether or not admixed with fillers, pigments, vulcanizing or accelerating agents.

I claim:

1. The method of preserving rubber which comprises treating rubber with the addition product of an aromatic nitro compound with a secondary aromatic amine.

2. The method of preserving rubber which comprises treating rubber with the addition product of a nitrated benzene derivative with a secondary aromatic amine.

3. The method of preserving rubber which comprises treating rubber with the addition product of a nitrated benzene derivative with an aryl-naphthylamine.

4. The method of preserving rubber which comprises treating rubber with the addition product of dinitro-chlorbenzene with an aryl-naphthylamine.

5. The method of preserving rubber which comprises treating rubber with the addition product of dinitro-chlorbenzene with phenyl-beta-naphthylamine.

6. A composition of matter comprising rubber and the addition product of an aromatic nitro compound with a secondary aromatic amine.

7. A composition of matter comprising rubber and the addition product of nitrated benzene derivative with a secondary aromatic amine.

8. A composition of matter comprising rubber and the addition product of a nitrated benzene derivative with an aryl-naphthylamine.

9. A composition of matter comprising rubber and the addition product of dinitro-chlorbenzene with an aryl-naphthylamine.

10. A composition of matter comprising rubber and the addition product of dinitro-chlorbenzene with phenyl-beta-naphthylamine.

11. A product resulting from the vulcanization of a composition comprising rubber, a vulcanizing agent, an accelerator of vulcanization and the addition product of an aromatic nitro compound with a secondary aromatic amine.

12. A product resulting from the vulcanization of a composition comprising rubber, a vulcanizing agent, an accelerator of vulcanization and the addition product of dinitro-chlorbenzene with phenyl-beta-naphthylamine.

13. The method of preserving rubber which comprises vulcanizing rubber in the presence of the addition product of an aromatic nitro compound with a secondary aromatic amine.

14. The method of preserving rubber which comprises vulcanizing rubber in the presence of the addition product of a nitrated benzene derivative with an aryl-naphthylamine.

15. The method of preserving rubber which comprises vulcanizing rubber in the presence of the addition product of dinitrochlorbenzene with phenyl-beta-naphthylamine.

In witness whereof I have hereunto set my hand this 12th day of November, 1928.

MARION C. REED.